United States Patent [19]

Maeda et al.

[11] Patent Number: 5,109,369
[45] Date of Patent: Apr. 28, 1992

[54] OPTICAL DISK DRIVE

[75] Inventors: Yasuaki Maeda; Ryo Ando; Hideo Obata, all of Tokyo, Japan

[73] Assignee: Sony Corporation, Tokyo, Japan

[21] Appl. No.: 357,262

[22] Filed: May 26, 1989

[30] Foreign Application Priority Data

May 30, 1988 [JP] Japan .................... 63-134091

[51] Int. Cl.$^5$ .................... G11B 7/00; H04N 5/78
[52] U.S. Cl. .................... 369/50; 369/54; 369/47; 369/32; 360/10.1
[58] Field of Search .................... 369/50, 44.26, 54, 47, 369/58, 59, 61, 44.25, 32, 44.13, 43; 360/10.01, 73.03, 27, 28, 77.17

[56] References Cited

U.S. PATENT DOCUMENTS

| | | | |
|---|---|---|---|
| 4,603,412 | 7/1986 | Yamazaki | 369/50 |
| 4,751,693 | 6/1988 | Yoshimaru | 369/50 |
| 4,755,980 | 7/1988 | Naito | 369/47 |
| 4,759,975 | 12/1988 | Taniyama | 369/44.26 |
| 4,896,311 | 1/1990 | Ishihara | 369/50 |

Primary Examiner—Roy N. Envall, Jr.
Assistant Examiner—Nabil Hindi
Attorney, Agent, or Firm—Hill, Van Santen, Steadman & Simpson

[57] ABSTRACT

An optical disc drive is disclosed in which an optical disc on which pregrooves are formed for affording wobble signals frequency modulated by predetermined data signals is driven at a constant linear velocity. Until the time that the data signals obtained upon demodulating the wobble signals are taken out correctly, the reproduced wobble signals are compared with a predetermined reference signal so that a spindle motor for rotating the optical disc is controlled so as to be driven at an approximately constant linear velocity. After it is detected that the data signals obtained upon demodulating the wobble signals are taken out correctly, the spindle motor is driven in a controlled manner on the basis of data signals obtained upon demodulating the reproduced wobble signals so that the spindle motor is controlled so as to be driven at a constant linear velocity. In this manner, the optical disc is controlled immediately at the start time of the optical disc or at the time of track jump by the optical head so that the optical disc is driven a constant linear velocity.

10 Claims, 4 Drawing Sheets

OPTICAL DISK DRIVE

BACKGROUND OF THE INVENTION

This invention relates to an optical disc drive wherein an optical disc is driven at a constant linear velocity (CLV), wherein pre-grooves for affording wobble signals frequency modulated by predetermined data signals are formed on the disc.

As the method for controlling the rotation in the above optical desk drive, it may be contemplated to use an optically recordable disc on which pre-grooves wobbled by the constant frequency signal are formed, and to apply a spindle servo so that the wobble signals afforded by the pre-grooves will be at a constant frequency.

The recording data previously recorded on the optically recordable disc employed in the optical disc drive of the present invention are divided into frames each of 75 Hz, as in the case of the compact disc (CD), and the absolute time since leading end of the spiral recording track corresponding to the record data on each frame is indicated as shown in FIG. 1, as absolute time data $DT_{AT}$ formed by 42 bits.

The absolute time data $DT_{AT}$ is constituted by 4-bit sync code $DT_{SYNC}$ minute data $DT_{MIN}$ composed of each 8-bit BCD (binary coded decimal), frame data $DT_{FRM}$ and 14-bit CRC data $DT_{CRC}$ computed by the predetermined polynominal generating the cyclic redundancy check.

This absolute time data $DT_{AT}$ is formed by NRZ (non-return-to-zero) code having a bit rate of 3.15 kbPS) or 42 bits×75 frames=3150 (bPS). This absolute time data $DT_{AT}$ is demodulated by the biphase mark at the bit clock of 6.3 kHz, while the demodulated biphase mark signals are frequency modulated to form wobble signals consisting of FM signals having the subcarrier frequency of 22.05 kHz.

In this manner, during producing of a master disc for an optically recordable disc, there are formed pre-grooves that are wobbled in a direction normal to the spirally extending recording tracks on the master disc on the basis of these wobble signals, whereby the pre-grooves are formed that are wobbled on the basis of the absolute time information. The optically recordable disc, on which the signals are formed in the above described manner, is hereinafter referred to as, the absolute time in pregroove format, or ATIP format.

Meanwhile, in the optical disc drive employing an optically recordable disc according to this ATIP format as the recording medium, since the wobble signals afforded by the pregrooves on the disc are the frequency modulated signals, spindle servo affected thereby and cause the jitter in the rotational speed.

For overcoming such disadvantage, spindle servo may be applied so that the bit clock of the biphase mark signals obtained upon demodulating the above wobble signals will be at a predetermined frequency to provide for rotation control to produce the rotation free of jitters.

However, even in this case, the phase lock of the bit clock regenerating circuit at the biphase demodulating section is disengaged at the start of disc rotation or track jumps by the optical head, so that accurate bit clocks cannot be produced.

SUMMARY OF THE INVENTION

It is therefore a principal object of the present invention to provide an optical disc drive wherein the disc may be driven at a constant linear velocity without causing jitters and driven at a substantially constant linear velocity at the start time of the rotation of the optically recordable disc or at the time of track jumps by the optical head.

According to the present invention, there is also provided an optical disc drive in which an optically recordable disc having pregrooves formed thereon for affording a wobble signal frequency modulated by predetermined data signals is driven at a constant linear velocity, comprising first spindle servo means for comparing the reproduced wobble signal with a predetermined reference signal to control a spindle motor to rotate said optical disc at a substantially constant linear velocity, and second spindle servo means controlling said spindle motor to rotate the optically recordable disc at a constant linear velocity on the basis of said data signals obtained upon demodulating said reproduced wobble signals.

According to the present invention, there is also provided an optically recordable disc drive in which an optical disc having pregrooves formed thereon for affording a wobble signal frequency modulated by predetermined data signals is driven at a constant linear velocity, wherein a spindle motor is driven in controlled manner by a third spindle servo signal consisting of a sum of a first spindle servo signal which depends upon the results of comparison between the reproduced wobble signal and a predetermined first reference signal and a second spindle servo signal which depends upon the results of comparison between said data signals obtained upon demodulating said reproduced wobble signals and a predetermined second reference signal so that said spindle motor is driven at a constant linear velocity.

These and other objects and novel features of the present invention will be more apparent from the following description of the referred embodiment of the present invention and the appended claims, when read in conjunction with the accompanying drawings.

DESCRIPTION OF PREFERRED EMBODIMENT

Referring to the accompanying drawings, an illustrative embodiment of the present invention will be explained in more detail hereinbelow.

Figures 2, 3:
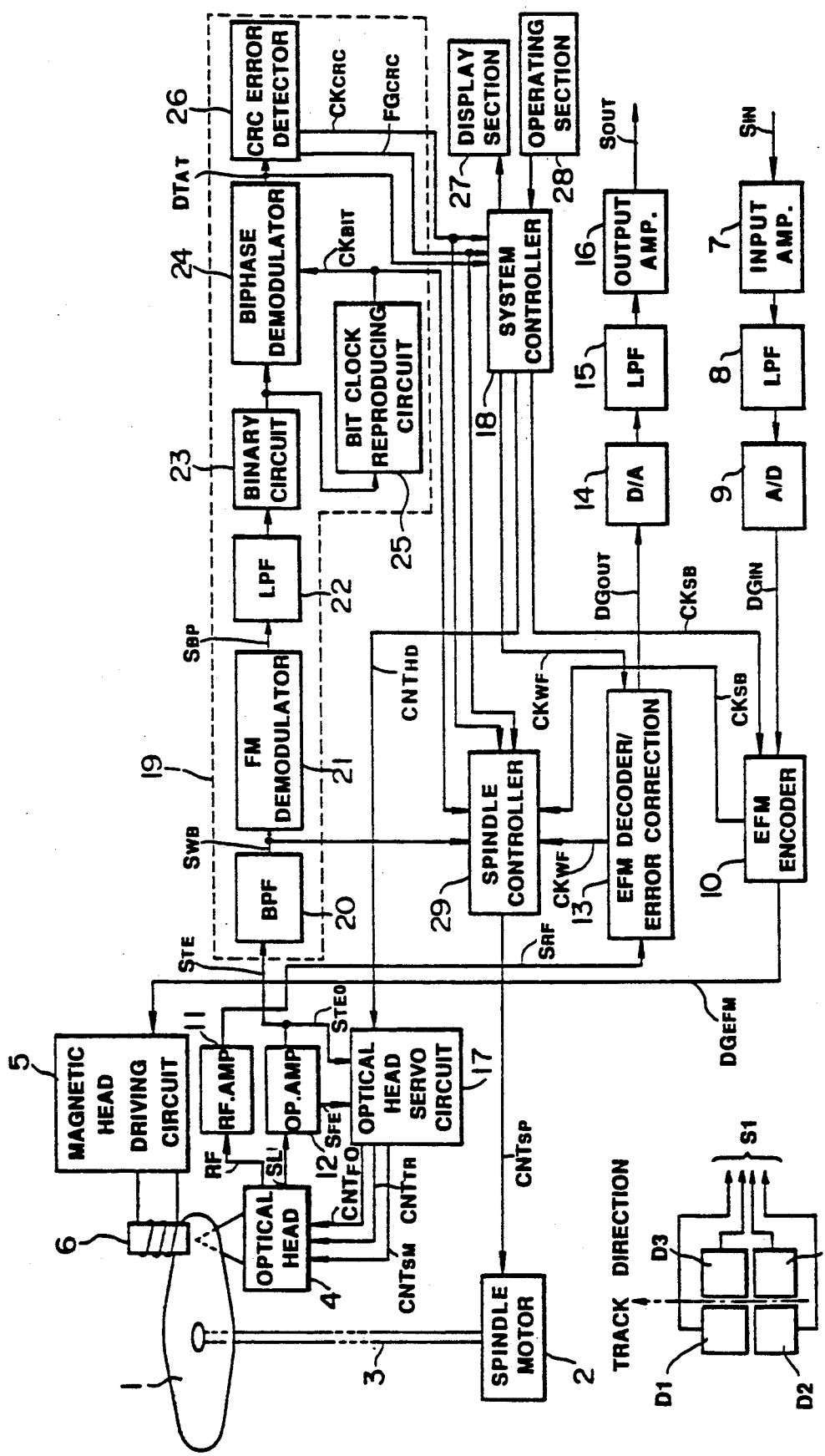
FIG. 2 is a block diagram showing the overall construction of the magneto-optical disc drive to which the present invention is applied.
FIG. 3 shows the structure of a photodetector for detecting servo signals employed in the disc drive.

In the block view of FIG. 2, there is shown a magneto-optical disc drive employing a magneto-optical disc 1, on which pregrooves are formed according to the ATIP format, as the optically recordable disc.

In such magneto-optical disc drive, a magneto-optical disc 1 is driven in a predetermined direction by a spindle motor 2 about a spindle 3 as center.

A laser light $L_0$ from an optical head 4 is irradiated on the pregroove on the disc 1, while a modulated magnetic field is applied on the pregroove by a magnetic head 6 which is controlled by a magnetic head driving circuit 5. Input signals $S_{IN}$ are supplied to an analog to digital converter 9 during recording via an input amplifier 7 and a low-pass filter 8 so as to be converted at the analog to digital converter 9 into input digital data $DG_{IN}$. These input digital data $DG_{IN}$ are eight to fourteen modulated in an eight-to-fourteen modulation (EFM) encoder 10 so as to be supplied as the magnetic field modulation signal $DG_{EFM}$ to the magnetic head driving circuit 5. The magnetic head driving circuit 5 then drives the magnetic head 6 to impress the modulated magnetic field to the magneto-optical disc 1, while the laser light $L_0$ is irradiated on the magneto-optical disc 1 by the optical head 4 from below for recording signals according to the magnetic field modulated signals $DG_{EFM}$ on the magneto-optical disc 1.

In the present magneto-optical disc drive, as the laser light $L_1$, wherein light power $L_1 < L_0$, is irradiated during reproduction by the optical lead 4 on the pregrooves on the magneto-optical disc 1, the returning light undergoes the Kerr rotation in accordance with the pattern of the direction of magnetization recorded on the magneto-optical disc, so that the reproduced output RF is produced from a photodetector for RF detection enclosed in the optical head 4. This reproduced output RF is outputted as the reproduced signal $S_{RF}$ via an RF demodulator 11. The reproduced signals $S_{RF}$ are eight to fourteen demodulated at an EFM decode/error correction circuit 13 and converted into output digital data $DG_{OUT}$ so as to be then outputted as output signals $S_{OUT}$ via a digital to analog converter 14, low-pass filter 15 and an output amplifier 16.

In the meanwhile, during recording and reproduction, the return light from the magneto-optical disc 1 of the laser light $L_0$ or $L_1$ emitted by the optical head 4 is detected by a photodetector D for servo signal detection which is shown in FIG. 3 and which is provided separately from the aforementioned photodetector for RF detection, and the detection signal $S_1$ obtained at the photodetector D for servo signal detection is supplied to an operational amplifier 12. As shown in FIG. 3, the photodetector D for servo signal detection is made up of four elements $D_1$, $D_2$, $D_3$ and $D_4$ divided in the track direction and in the direction orthogonal to the track direction. In the operational amplifier 12, the sum of the outputs from the elements $D_1$ and $D_4$ is subtracted from the sum of the outputs from the elements $D_2$ and $D_3$ to produce a focusing error signal $S_{FE}$, while the sum of the outputs of the elements $D_1$ and $D_2$ is subtracted from the sum of the outputs of the elements $D_3$ and $D_4$ to produce a differential output signal $S_{TE}$. This differential output signal $S_{TE}$ is also a tracking error signal and is referred to as the tracking error signal $S_{TEO}$ when it is supplied to an optical head servo circuit 17.

The optical head servo circuit 17 is supplied with focusing error signals $S_{FE}$ and tracking error signals $S_{TEO}$ produced at the operational amplifier 12, and produces a tracking control signal, sled motor control signal $CNT_{SM}$ and a focus control signal $CNT_{FO}$, all of which perform fine and course tracking and focusing control of the optical head 4.

A track jump control signal $CNT_{HD}$ for shifting the optical head 4 to a desired track position for accessing is produced by a system controller 18 and supplied to the optical head servo circuit 17.

On the other hand, the differential output signal $S_{TE}$ obtained from the operational amplifier 12 is also supplied to an absolute time reproducing/processing section 19.

Figure 4:
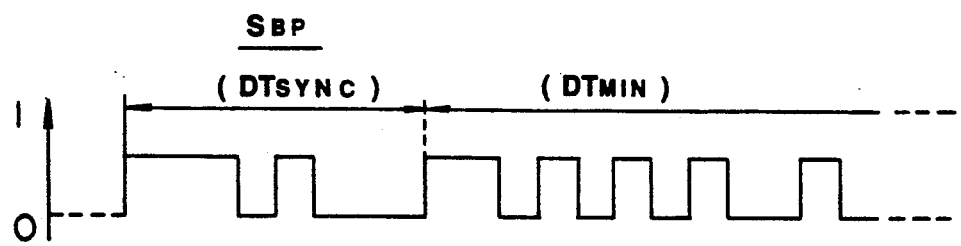
FIG. 4 is a waveform diagram showing biphase mark signals demodulated in the disc drive.

In this section 19, the differential output signal $S_{TE}$ is introduced to a bandpass filter 20 having a center frequency of 22.05 kHz and a predetermined pass band, where the wobble signal $S_{WB}$ contained in the differential output signal $S_{TE}$ is extracted and transmitted to a frequency demodulator 21. The wobble signal $S_{WB}$ is demodulated in the frequency demodulator 21 and biphase mark signals $S_{BP}$ of FIG. 4 produced in this manner in the frequency demodulator 21 are supplied via a low pass filter 22 to a binary circuit 23 of a comparator circuit configuration where the biphase mark signals are formed into corresponding binary signals which are then entered to a biphase demodulator 24 and to a bit clock regenerating circuit 25 of a phase locked loop configuration.

Figure 1:
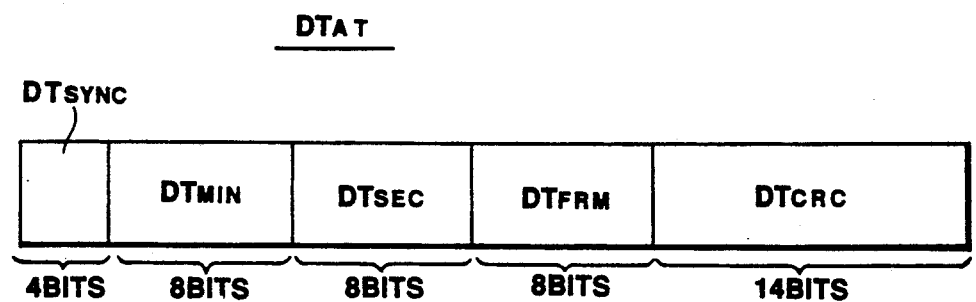
FIG. 1 is a diagrammatic view for illustrating the ATIP format adopted in the optically recordable disc employed in an optical disc drive of the present invention.

The biphase demodulating circuit 24 demodulates the biphase mark signal $S_{BP}$ on the basis of the 6.3 kHz bit clocks $CK_{BIT}$ produced in the bit clock regenerator 25 to produce the aforementioned absolute time data $DT_{AT}$ shown in FIG. 1, which absolute time data $DT_{AT}$ are transmitted to a CRC error detector 26 and to the system controller 18.

The CRC error detector 26 detects CRC errors by having reference to the CRC data $DT_{CRC}$ contained in the absolute time data $DT_{AT}$ obtained at the biphase demodulating circuit 24 and transmits the CRC error flag $FG_{CRC}$ indicating the result and its CRC error detection clock $CK_{CRC}$ to the system controller 18.

When the input CRC error flag $FG_{CRC}$ indicates the absence of the CRC error, the system controller 18 indicates the absolute time data $DT_{AT}$ in, for example, a display section 27, while controlling the magneto-optical disc drive in its entirety using the access command signals entered by the operating section 28 or the absolute time data $DT_{AT}$.

In the present embodiment, the magneto-optical disc 1 is controlled in its rotation speed at constant linear velocity during the steady-state operation by the spindle motor 2 and a spindle control circuit 29 in accordance with the 6.3 kHz bit clock $CK_{BIT}$ produced in the bit clock regenerating circuit 25, while being controlled so as to be rotated at a substantially constant linear velocity using wobble signals $S_{WB}$ produced at the bandpass filter 20 of the absolute time reproducing section 19 in case the phase locked loop of the bit clock regenerating circuit 25 is not in phase lock state correctly, such as at the start of rotation of the disc 1 or at the time of track jumps by the optical head 4, and hence correct bit clocks $CK_{BIT}$ cannot be produced.

Figure 5:
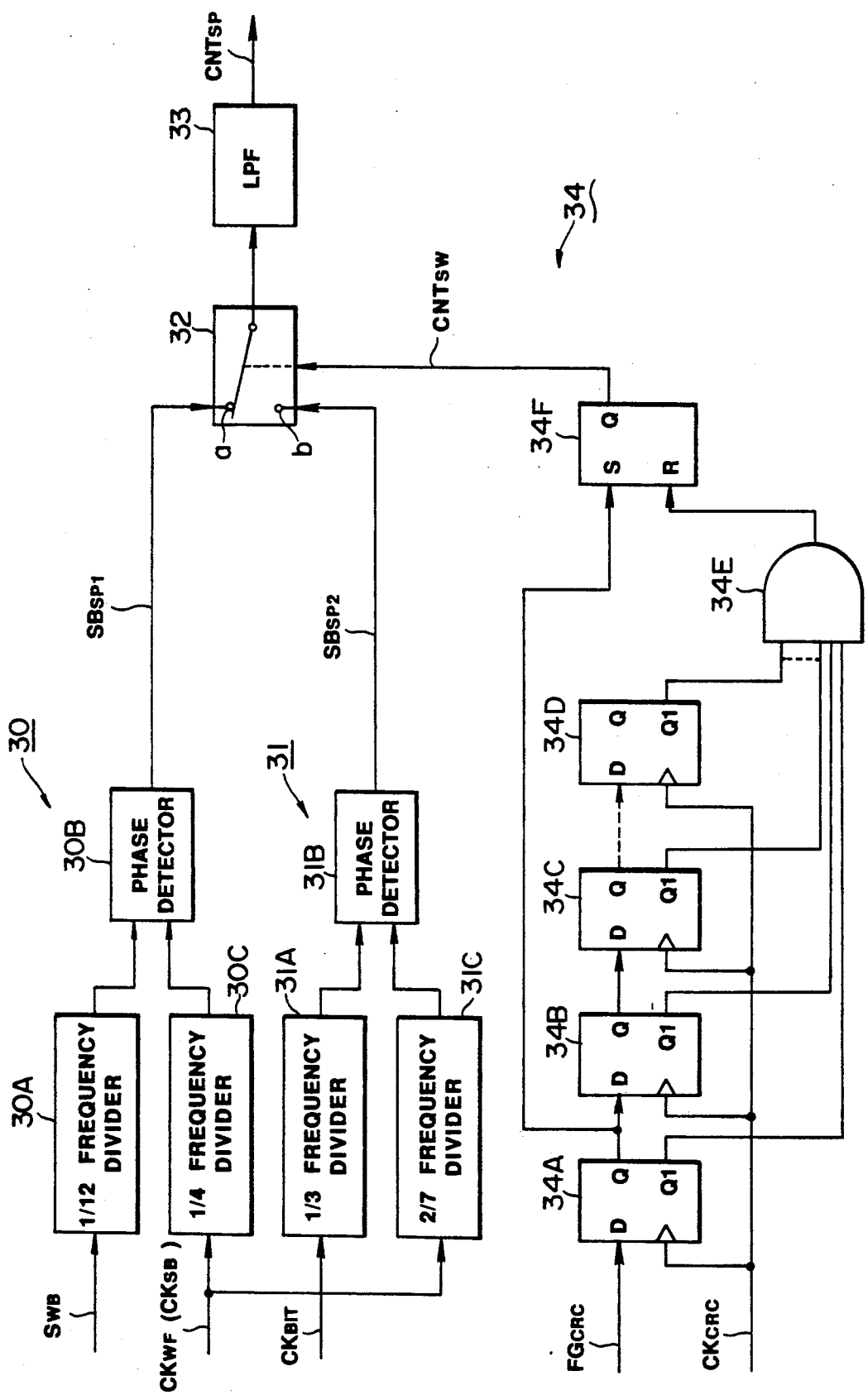
FIG. 5 is a block diagram showing the construction of a spindle control circuit employed in the disc drive.

As shown in detail in FIG. 5, the spindle control circuit 29 is so arranged and constructed that a first spindle servo signal $SB_{SP1}$ obtained at a first spindle servo circuit 30 is entered to a first terminal a of a switching circuit 32, a second spindle servo signal $SB_{SP2}$ obtained at a second spindle servo circuit 31 is entered to a second terminal b of the switching circuit 32, and the output of the switching circuit 32 is transmitted to the spindle motor 3 via low pass filter 33 as the spindle motor control signal $CNT_{SP}$.

The first spindle servo circuit 30 receives wobble signals $S_{WB}$ produced at the bandpass filter 20 of the absolute time reproducing/processing section 19, at a 1/12 frequency divider 20A, and inputs the 1/12 frequency divided signal as a comparison signal to a phase detector 30B.

The ¼ frequency divided 1.8375 kHz signal, produced in a ¼ frequency divider 30C receiving a 7.35 kHz reference clock $CK_{SB}$ or $CK_{WF}$ from the system controller 18 via the EFM encoder 10 at the recording time or via the EFM decoder/error correction circuit 13 at the reproducing time, is also supplied to the phase detector 30B as the reference signals.

The phase detector 30B compares the above comparison signal and reference signal and transmits the results of comparison such that the frequency of the wobble signal $S_{WB}$ is equal to 22.05 kz or 1.8375 kHz × 12, to the first terminal a of the switching circuit 32 as the first spindle servo signal $SB_{SP1}$.

Then, using the first spindle servo signal $SB_{SP1}$ as the spindle motor control signal $CNT_{SP}$, the spindle control circuit 29 controls the spindle motor 2 to effect servo control so that the wobble signal $S_{WB}$ produced from the magneto-optical disc 1 has the frequency of 22.05 kHz to control the magneto-optical disc 1 so as to be rotated at a substantially constant linear velocity.

The second spindle servo circuit 31 receives the 6.3 kHz bit clocks $CK_{BIT}$ produced at the bit clock regenerating circuit 25, at a ⅓ frequency divider 31A, and inputs the ⅓ frequency divided signal as the comparison signal to a phase detector 31B.

Also a 2/7 frequency divided 2.1 kHz signal, produced at a 2/7 frequency divider 31C receiving a 7.35 kHz reference clock $CK_{SB}$ or $CK_{WF}$ transmitted from the system controller 18 via the EFM encoder 10 at the recording time or via the EFM decoder/error correction circuit 13 at the reproducing time, is also transmitted to the phase detector 30B as the reference signal.

The phase detector 31B compares the above comparison and reference signals and transmits the results of comparison such that the bit clock $CK_{BIT}$ correctly has the frequency of 6.3 kHz (=2.1 (kHz)×3) as the second spindle servo signal $SB_{SP2}$ to the second terminal b of the switching circuit 32.

Then, using the second spindle servo signal $SB_{SP2}$ as the spindle motor control signal $CNT_{SP}$, the spindle control circuit 29 controls the spindle motor to effect servo control so that the bit clock $CK_{BIT}$ extracted from the reproduced biphase mark signal $S_{BP}$ obtained from the magneto-optical disc 1 correctly has the frequency equal to 6.3 kHz to control the rotation of the magneto-optical disc 1 correctly in accordance with the CLV system.

Depending on the logical level of the switching control signal $CNT_{SW}$ obtained at the switching control circuit 34, the switching circuit 32 selects the first terminal a when the switching control signal $CNT_{SW}$ is at the logical level "L", while selecting the second terminal b when the switching control signal $CNT_{SW}$ is at the logical level "H".

A CRC error flag $FG_{CRC}$ having a logical values of "1" and "0" when the CRC error is or is not detected, respectively, is entered from the CRC error detector 26 into the switching control circuit 34, along with the CRC error detection clock $CK_{CRC}$.

In this switching control circuit 34, the CRC error flag $FG_{CRC}$ is entered into an input terminal D of a first D-flipflop 34A, the output terminal Q of which transmits a non-inverting output to an input terminal D of a second D-flipflop 34B, the output terminal Q of which transmits a non-inverting output to an input terminal D of a third D-flipflop 34C.

The aforementioned CRC error detection clocks $CR_{CRC}$ are transmitted to clock terminals of a plurality of, herein four, serially connected D-flipflops 34A to 34D, to which the CRC error flags $FG_{CRC}$ are transmitted sequentially, as described hereinabove.

The inverting outputs from the inverting output terminals Q1 of the D-flipflops 34A to 34D are transmitted to an AND gate 34E, the logical output of which is transmitted to a reset terminal R of an RS-flipflop 34F.

The non-inverting output from the output terminal Q of the first D-flipflop 34A is supplied to a set terminal S of the RS-flipflop 34F.

Thus the non-inverting output from the output terminal Q of the RS-flipflop 34F goes to a logical level "H" at the timing when the CRC error flag $FG_{CRC}$ is changed from the value "1" to the value "0", while going to a logical level "L" at the timing when the CRC error flag $FG_{CRC}$ detects the state of the value "0" four time consecutively, starting from the state of the value of "1".

Thus, depending on the CRC error flag $FG_{CRC}$ produced at the CRC error detector 26, the switching control circuit 34 selects the first terminal a of the switching circuit 32 on consecutive detection of the four CRC errors to transmit the first spindle servo signal $SB_{SP1}$ as the above spindle motor servo signal $CNT_{SP}$, while selecting the second terminal b of the switching circuit 32 on detection of the absence of the CRC error once to transmit the second spindle servo signal $SB_{SP2}$ as the spindle motor servo signal $CNT_{SP}$.

The switching control circuit 34 is so arranged and constructed that, since the switching control circuit 32 is switched on consecutive detection of the CRC errors four times, the spindle control circuit 29 is not responsive in its operation to CRC errors caused by dropout or noise produced during steady-state rotation of the magneto-optical disc 1.

In the above described magneto-optical disc drive, during the start of rotation of the magneto-optical disc 1 or track jumps by the optical head 4, for example, the phase locked loop of the bit clock reproducing circuit 25 is not in the phase-locked state, so that the bit clocks $CK_{BIT}$ cannot be obtained correctly. As a result, the absolute time data $DT_{AT}$ cannot be reproduced correctly, so that the CRC errors are detected plural times on end.

It will be noted that the spindle control circuit 29 transmits the first spindle servo signal $SB_{SP1}$ as the spindle motor servo signal $CNT_{SP}$ to effect servo control in such a manner that the wobble signal $S_{WB}$ produced from the magneto-optical disc 1 has the frequency of 22.05 kHz, so that the disc 1 can be quickly controlled to rotate at a substantially constant linear velocity.

When the magneto-optical disc 1 is controlled to rotate in this manner at the substantially constant linear velocity until the bit clock reproducing circuit 25 is within the range of being forced into the phase locked state by the phase locked loop, the bit clocks $CK_{BIT}$ can now be produced correctly, as a result of which the absolute time data $DT_{AT}$ can be reproduced correctly, so that it may be detected that there is no CRC error.

When such state is reached, the spindle control circuit 29 issues the second spindle servo signal $SB_{SP2}$ as the spindle motor control signal $CNT_{SP}$ and performs servo control such that the bit clock $CK_{BIT}$ extracted from the biphase mark signal $S_{BP}$ reproduced from the wobble signals $S_{WB}$ derived from the magneto-optical disc 1 correctly has the frequency of 6.3 kHz, thereby realizing the accurate rotational contorl of the magneto-optical disc 1.

In the above described embodiment of the present invention, the reproduced wobble signal $S_{WB}$ is compared with a prescribed reference signal until the absolute time data $DT_{AT}$ obtained upon demodulation of the wobble signals $S_{WB}$ is taken out correctly, so that the spindle motor 2 rotationally driving the magneto-optical disc 1 is driven to rotate in a controlled manner at a substantially constant linear velocity. After it is detected that the absolute time data $DT_{AT}$ obtained upon demodulation of the wobble signals $S_{WB}$ can be taken out correctly, the bit clocks $CK_{BIT}$ obtained upon demodulation of the reproduced wobble signals are compared with prescribed reference signals to effect the driving of the spindle motor 2 in a controlled manner. In this manner, a magneto-optical disc drive is realized in which the magneto-optical disc 1 can be immediately driven in a controlled manner and without causing jitters at the time of the start of rotation of the magneto-optical disc 1 or at the time of track jumps by the magneto-optical disc 1.

Figure 6:
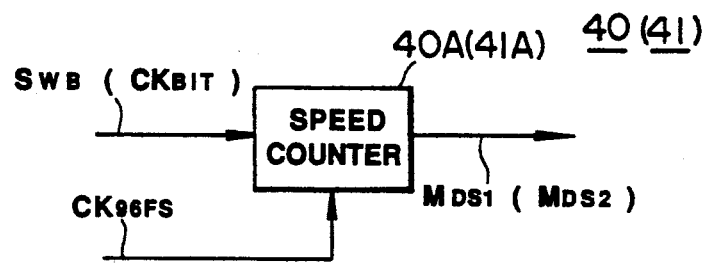
FIG. 6 is a block diagram showing essential portions of a modified embodiment of the present invention.

In the foregoing, the first spindle servo circuit 30 and the second spindle servo circuit 31 are employed in which the input wobble signals $S_{WB}$ or the bit clocks $CK_{BIT}$ are frequency divided and phase compared with the frequency divided signals of the reference clocks $CK_{SB}$ or $CK_{WF}$. However, the present invention is not limited to this specified construction. Thus the effects similar to those of the preceding embodiment may also be obtained when, as shown for example in FIG. 6, a third spindle servo circuit 40 or a fourth spindle servo circuit 41 is employed in which the input wobble signal $S_{WB}$ or the bit clocks $CK_{BIT}$ is received at a speed counter 40A or 41A, along with a speed reference signal $CK_{96FS}$ having the frequency of, for example, 4.2336 MHz ($=96\times44.1$ kHz), the period of the wobble signal $S_{WB}$ or the bit clock $CK_{BIT}$ is measured at this speed counter 40A or 41A and in which the thus produced speed error signal $M_{DS1}$ $M_{DS2}$ is used as the spindle motor control signal $CNT_{SP}$.

Figure 7:
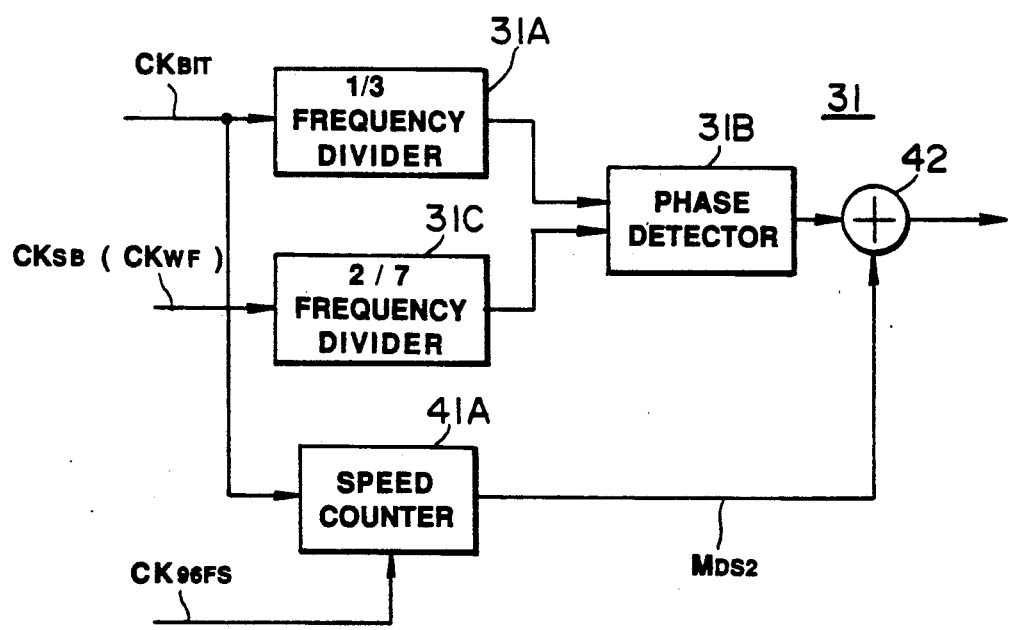
FIG. 7 is a block diagram showing essential portions of another modified embodiment of the present invention.

Or alternatively, a fourth spindle servo circuit 41 may be annexed to, for example, the second spindle servo circuit 31, including the phase detector 31B, as shown in FIG. 7, the spindle servo signal $SB_{SP2}$ from the second spindle servo circuit 31 and the speed error signal $M_{DS2}$ from the fourth spindle servo-circuit 41 are summed together at a summing cirucit 42, and the sum signal is employed as the spindle motor control signal $CNT_{SP}$.

The above construction allows for more stable and extensive servoing.

Also, in the above embodiment, use is made of a magneto-optical disc in which pre-grooves are formed in accordance with the ATIP format by wobble signals consisting in the frequency modulated absolute time data. However, the present invention again is not limited to this embodiment, but may be extensively applied to instances wherein an optically recordable disc, such as a DRAW disc having pregrooves formed thereon for affording wobble signals frequency modulated by prescribed data signals is driven at a substantially constant linear velocity.

What is claimed is:

1. An optical disc drive in which an optically recordable disc having pregrooves formed thereon for affording a wobble signal frequency modulated by predetermined data signals is driven at a constant velocity, comparing;
   first spindle servo means for comparing the reproduced wobble signal with a predetermined reference signal to control a spindle motor to rotate said optical disc at a substantially constant velocity,
   second spindle servo means controlling said spindle motor to rotate said optical disc at a constant velocity on the basis of said data signals obtained upon demodulating said reproduced wobble signals, and
   switching means responsive to said data signals for selectively enabling either said first spindle servo means or said second spindle servo means.

2. The optical disc drive according to claim 1 further comprising:
   switching means for selecting said first spindle servo means and said second spindle servo means.

3. The optical disc drive according to claim 2 further comprising:
   detecting means for detecting whether said data signals obtained upon demodulating said wobble signals are taken out correctly, and for controling said switching means.

4. The optical disc drive according to claim 3, wherein said detection means includes a CRC error detecting circuit.

5. The optical disc drive according to claim 4, wherein said detecting means further includes circuit means for detecting that said CRC error detecting circuit has detected CRC errors a plural times on end.

6. An optical disc drive in which an optically recordable disc having pregrooves formed thereon for affording a wobble signal frequency modulated by predetermined data signals is driven at a constant velocity, comprising;
   first comparison means for comparing a reproduced wobble signal and a predetermined first reference signal, to provide a first spindle servo signal,
   second comparison means for comparing data signals obtained from demodulating said reproduced wobble signal and a predetermined second reference signal, to produce a second spindle servo signal, and
   summing means for summing said first spindle servo signal and said second spindle servo signal for producing a third spindle signal connected to said spindle motor for driving said spindle motor.

7. The optical disc drive according to claim 6 further comprising:
   switching means for selecting said first spindle servo signal and said third spindle servo signal to effect driving control of said spindle motor.

8. The optical disc drive according to claim 7 further comprising:
   detecting means for detecting whether said data signals obtained upon demodulating said wobble signals are taken out correctly, and for controlling said switching means.

9. The optical disc drive according to claim 8, wherein said detecting means includes a CRC error detecting circuit.

10. The optical disc drive according to claim 9, wherein said detecting means further includes circuit means for detecting that said CRC error detecting circuit has detected CRC a errors plural number of consecutive times.

* * * * *